Patented Sept. 7, 1948

2,449,011

UNITED STATES PATENT OFFICE 2,449,011

METHOD FOR PRODUCING ACYLAMINO DIANTHRIMIDE ACRIDONES

Mario Scalera, Somerville, and Asa W. Joyce, Plainfield, N. J., assignors to American Cyanamid Company, New York, N. Y., a corporation of Maine No Drawing. Application June 1, 1944, Serial No. 538,346

2 Claims. (Cl. 260—276)

This invention relates to alpha acylamino dianthrimide acridones.

The products of the present invention are derivatives of 1,1'-dianthrimide-2,2'-acridone having the formula:

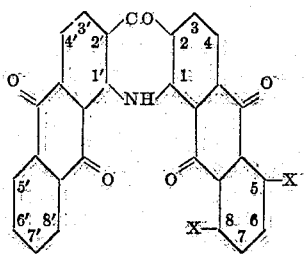

in which one X is acylamino, the other X is an hydrogen, and derivatives of 2,1'-dianthrimide-1,2'-acridone having the formula:

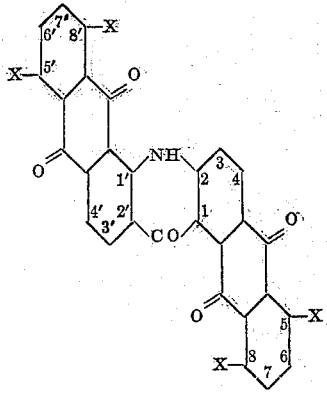

in which one X is acylamino, the other X is an hydrogen. Throughout the specification and claims the term "acyl" will be used in its more limited sense as meaning the acid radical of a carboxylic acid and it should be understood that it has no other meaning.

The products of our invention are vat dyestuffs which dye cellulosic fibers orange to scarlet to brown shades of great brilliance. This result is particularly surprising in view of the fact that all previous efforts to prepare this type of compounds had led to products dyeing the fiber in very dull shades.

Thus, it has been proposed to prepare certain mono-acylamino derivatives of dianthrimide acridones by nitration of the unsubstituted dianthrimide acridone, reduction and acylation. This procedure results in the production of vat dyestuffs of unknown constitution, which dye cellulosic fibers dull violet gray to olive gray shades. These compounds are obviously not identical with the compounds of our invention.

It has also been proposed to prepare monoacylamino derivatives of 1,1'-dianthrimide-2,2'-acridone by the reaction of 1-amino anthraquinone-2-aldehyde with an alpha chloro acylamino anthraquinone, and subsequent hydrolysis of the product in aqueous suspension. This procedure leads to compounds so different in their characteristics from those of the present invention that they can not possess the same formula. The formulae of the compounds of the present invention are proven by their synthesis. In the case of the benzoylamino derivative the compound prepared in accordance with U. S. Patent 1,706,933, dyes cotton dull brown shades of poor fastness, while the compound prepared according to the process of the present specification dyes vivid orange shades of outstanding fastness properties. This difference is not one of purity only, as even a drastic oxidation, with sodium hypochlorite or dichromate in aqueous suspension, is not capable of converting the dull brown product into the orange.

It must be concluded that the benzoylamino products obtainable by the process of the above mentioned U. S. patent are not acridones at all. It is not improbable that they are acridines or hydroxy acridines containing one of the rings:

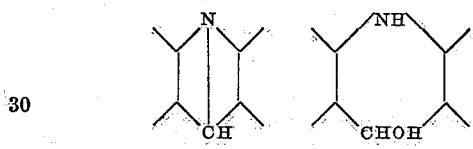

which would be more likely to form by the process therein described.

While it seems probable that the compound of U. S. Patent 1,706,933 possesses one or other of the rings set above it is not desired to limit the present invention definitely to any theory. It is, however, certain that the compounds of the present invention can not possess the same formula as those of the U. S. Patent 1,706,933.

In its broader aspects the present invention is not limited to any particular method of producing the alpha acylamino dianthrimide acridones. However, there are two general methods which will give good results. The first method involves production of mono alpha amino dianthrimide acridones, preferably by a ring closure in concentrated sulfuric acid of ortho carboxy (or ortho cyano) monoacylamino dianthrimides. This ring closure is usually accompanied by hydrolysis of the acylamino group. In such a case it is followed by a reacylation with the conventional acylating agents. The production of the amino dianthrimide acridones and the products themselves are not claimed per se in the present application but form the subject matter of our copending application Serial No. 538,344, filed June 1, 1944. An alternative method is to ring close the ortho carboxy monoacylamino dianthrimides or their esters by ring closing agents which do not split the acylamino group. Such an agent is, for example, benzoyl chloride in the nitrobenzene, preferably with catalytic amounts of sulfuric acid.

The processes referred to above produce products which are of a good purity. However, for some purposes it may be desirable to subject them to additional purification and it is an advantage of the present invention that this purification may be effected easily by well known chemical procedures such as recrystallization from nitrobenzene, fractional precipitation of the sulfates of the dyestuffs from sulfuric acid, and the like. A very excellent method of purification consists in producing a finely divided aqueous suspension of the products, for example, by acid-pasting in sulfuric acid or by vatting, and subjecting the suspension to the action of oxidizing agents such as sodium dichromate in acid solution or sodium hypochlorite in neutral or weakly alkaline solution.

It is an advantage of the present invention that a wide variety of acyl groups may be present, such as, for example, acetyl, chloro acetyl, benzoyl or halogenated benzoyl, naphthoyl, and the acyl radicals of anthraquinone carboxylic acids and furane carboxylic acids. The present invention will be described in greater detail in conjunction with the following specfic examples, which are typical, the parts being by weight.

*Example 1*

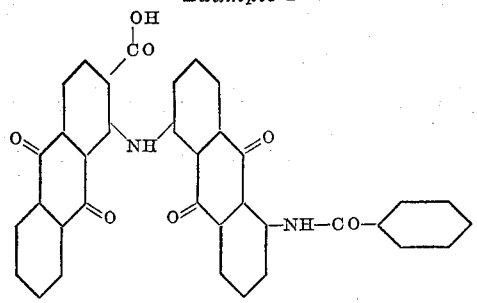

51.9 parts 1-benzoylamino-5-aminoanthraquinone are introduced into 480 parts mono nitrobenzene, then there are added 59.7 parts 1-chloroanthraquinone-2-carboxylic acid benzyl ester, 22.0 parts sodium carbonate, 12.0 parts sodium acetate (anhydrous) and 3.0 parts cuprous chloride. This mass is agitated and heated for about six hours at 185–190°. After cooling to room temperature and further diluting with about 100–200 parts nitrobenzene, the brownish red reaction product is filtered, washed first with nitrobenzene and finally with alcohol. The filter cake is steamed to remove traces of nitrobenzene and the alkaline slurry filtered to remove alkali-soluble impurities. The filter cake is then slurried in 1,000 parts water at about 75° and made acid with conc. HCl, filtered and washed. The yield of benzoylamino dianthrimide carboxylic acid ester is about 90% of the theoretical. It is a brick-red substance dissolving in conc. sulfuric acid with a greenish-yellow color. It may be purified by recrystallization from 20 parts o-dichlorobenzene.

Hydrolysis to the carboxylic acid is carried out by introducing 68.0 parts 5-benzoylamino-1,1'-dianthrimide-2'-carboxylic acid benzyl ester into a solution of 60.0 parts caustic potash in 400 parts alcohol (denatured formula 3A), 250.0 parts pyridine and 120.0 parts water, then heating to boiling for about four hours. The potassium salt of the carboxylic acid is only partly dissolved, its solution being red. The whole mass is now drowned in a mixture of about 480.0 parts conc. HCl and about 600.0 parts water, stirred for about 30 minutes at 75–80°, filtered and washed free of mineral acid. It is then dried. The yield is excellent. It is sparingly soluble in hot aqueous dilute alkalies with a red color. Its alkaline hydrosulfite vat is brown and its solution in conc. sulfuric acid is red-brown.

*Example 2*

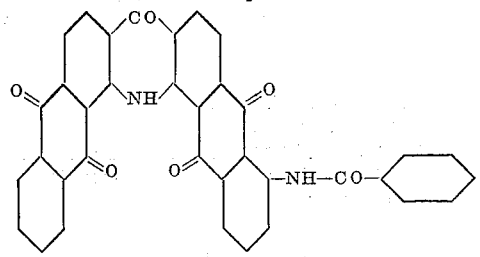

12.0 parts 5-benzoylamino-1,1'-dianthrimide-2'-carboxylic acid prepared as described in Example 1 are introduced into 100 parts nitrobenzene, then 4.2 parts benzoyl chloride are added and the mass heated at 130°–145° for about four hours. It is then cooled to 90° and a mixture of 3.0 parts conc. sulfuric in 20.0 parts nitrobenzene added. The temperature is now raised to about 105–110° and maintained there until ring closure is completed, which takes about three hours. The separated acridone is now filtered and washed first with nitrobenzene, then with alcohol. The dry benzoylamino dianthrimide acridone so obtained is an orange-brown crystalline product, dissolving in conc. sulfuric acid with an orange color. It dyes vegetable fibers from a violet colored vat red-orange shades of excellent fastness properties.

*Example 3*

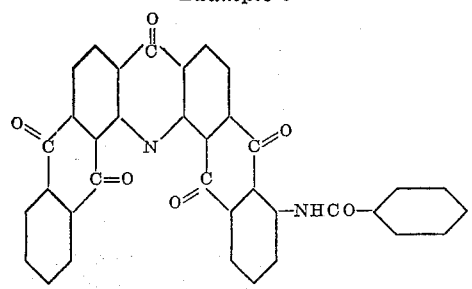

13.8 parts of 5-benzoylamino-1,1'-dianthrimide-2'-carboxylic acid benzyl ester are suspended in 60 parts of dry nitrobenzene. After the addition of 5.6 parts benzoyl chloride the mass is stirred for about 2 hours at 190–200°. The whole is then diluted with 60 parts dry nitrobenzene and cooled to 100°, 1.3 parts conc. sulfuric acid is now added the mass stirred at about 120° for a further 2 hours. The benzoylamino dianthrimide acridone is separated from the nitrobenzene by filtration and washing with nitrobenzene and alcohol. It may be purified by recrystallization from hot nitrobenzene. It is identical with the compound of Example 2 which shows the same properties. Its shade is rendered clearer and brighter by acid pasting in conc. sulfuric and subsequent oxidation with sodium dichromate.

*Examples 4*

50.5 parts 5-benzoylamino-1,1'-dianthrimide-2'-carboxylic acid prepared as described in Example 1 are added slowly to 750 parts sulfuric acid of 98% strength, which is being well stirred. An olive-brown solution forms. It is heated up to about 90° and held at this temperature for about two hours. The color of the solution changes to orange. After it has been cooled to about 50°, the concentration of the acid is cut to about 71% by adding gradually about 270 parts cold water, permitting the temperature to rise to about 80-85°. A brick-red substance separates which is the sulfate of the amino acridone. It is filtered, washed with a small quantity of 70-71% sulfuric and the filter cake slurried in about 500 parts warm water. This hydrolyzes the sulfate with formation of the brown colored amino acridone base. It is filtered, washed and dried. The yield is nearly theoretical.

Its benzoyl derivative is prepared as follows: 18.8 parts of the amino dianthrimide acridone so obtained are introduced into 180.0 parts nitrobenzene, then 2.0 parts pyridine and 7.0 parts benzoyl chloride are added. While agitating, the mass is heated to a temperature of about 180-190°, where it is maintained for about 3 to 4 hours, when the benzoylation is substantially completed. The reaction mass is then permitted to cool to about 100°, filtered, washed with nitrobenzene and alcohol and dried. The yield of benzoylamino derivative is practically theoretical. It is a reddish orange crystalline body, dissolving in strong sulfuric acid with an orange color, and is identical to the product obtained in Example 3.

*Example 5*

The shade of the product obtained in Example 4 is considerably brightened and its fastness to chlorine and washing improved by subjecting the crude dye to the following treatment:

5 parts of crude dye are dissolved in 75 parts of sulfuric acid of about 85% concentration at 10-20° and then drowned, filtered and washed free of acid. The paste so obtained is rubbed in about 20 parts of water to form a fine slurry and treated at 70-80° with sodium hypochlorite solution until no more hypochlorite is consumed and an excess may be detected. The paste thus obtained is bright orange-red, whereas the original unoxidized dye paste is orange-brown. It dyes cotton bright red-orange shades having superior fastness properties, and a more vivid hue, than the same material before oxidation.

*Example 6*

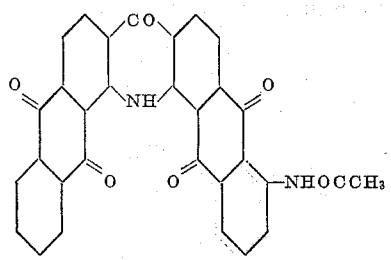

47 parts of the 5-amino 1,1'-dianthrimide-2,2'-acridone, prepared as described in the first paragraph of Example 4 are added to a mixture of 15 parts acetyl chloride and 8 parts pyridine in 900 parts nitrobenzene. It is then heated up to 160-165° for a few hours, when the acetylation is substantially completed. After cooling it is filtered and washed with alcohol. The acetylamino dianthrimide acridone so obtained is an orange-brown crystalline body. It dyes cotton a reddish-orange shade which is made considerably clearer and brighter if it subjected to a treatment with sodium hyprochlorite as described in Example 5.

*Example 7*

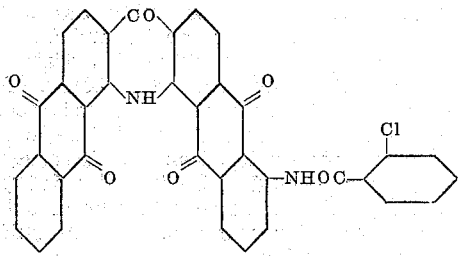

47 parts of the amino dianthrimide acridone, prepared as described in the first paragraph of Example 4 are added to a mixture of 26 parts o-chlorobenzoyl chloride, 4 parts pyridine and 900 parts nitrobenzene and then heated at 185-190° for several hours, when the reaction is substantially completed. After it is cooled, the reaction mass is filtered, washed with alcohol and dried. The o-chlorobenzoylamino dianthrimide acridone thus obtained dyes cotton a strong orange shade somewhat yellower than the product of Example 4. Its shade is considerably brightened if it is given a treatment with sodium hypochlorite in aqueous suspension.

*Example 8*

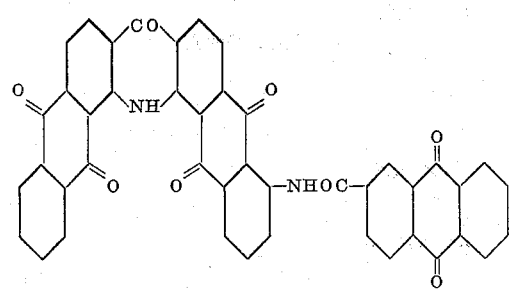

47 parts of the amino dianthrimide acridone, prepared as described in the first paragraph of Example 4 are added to a mixture of 45 parts anthraquinone-2-carboxylic acid chloride, 8 parts pyridine and 900 parts nitrobenzene and the mass heated at 190-200° for several hours. After cooling the reaction product is filtered, washed with alcohol and dried. The 5-(beta anthraquinonoyl)-amino-1,1'-dianthrimide-2,2'-acridone so obtained is an orange-brown body. It dyes cotton a reddish-orange shade, which is considerably brighter if the crude dye is first subjected to a treatment with sodium hypochlorite.

*Example 9*

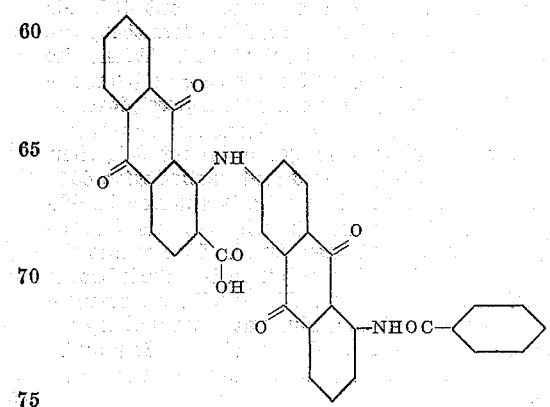

18.1 parts 1-benzoylamino-6-chloroanthraquinone and 14.1 parts 1-aminoanthraquinone-2-carboxylic acid methyl ester are introduced into 90 parts nitrobenzene. There is then added 8.0 parts soda ash, 4.2 parts anhydrous sodium acetate, 1.3 parts copper powder and 0.08 part iodine crystals. The whole mass is agitated and heated to boiling for about nine hours. After cooling to about 100°, the reaction mass is steamed to remove nitrobenzene. The alkaline aqueous liquor is removed by filtration and the crude reaction product heated to boiling with 100 parts toluene, filtered, washed with toluene and dried. It is a red-brown body dissolving in conc. sulfuric acid with a blue color.

For hydrolysis to its carboxylic acid, 25.5 parts of 5-benzoylamino 2,1'-dianthrimide - 2' - carboxylic acid methyl ester so obtained are introduced into a solution of 22 parts caustic potash in 44 parts water, 200 parts alcohol and 90 parts pyridine. The whole mass is now heated to boiling for about three hours aind filtered from a small amount of insoluble material. The filtrate is acidified with about 300 parts dilute hydrochloric acid (1 part conc. HCl to 2 parts water). The precipitated carboxylic acid is filtered, washed with water and dried. It is a brick-red body dissolving in conc. sulfuric acid with an olive-green color. It is somewhat more soluble in dilute alkaline solutions than the corresponding 5-benzoylamino-1,1'-dianthrimide-2' - carboxylic acid.

*Example 10*

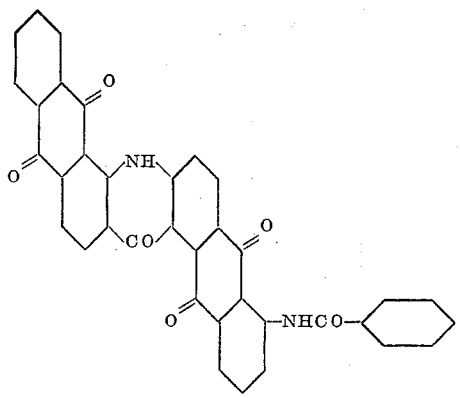

17.1 parts of 5-benzoylamino-2,1'-dianthrimide-2'-carboxylic acid prepared as described in Example 9 are dissolved in 260 parts 98% sulfuric acid at room temperature. While agitating, the olive-green solution is heated up to about 95-100° and held at this temperature for about two hours. The color of solution changes to orange-brown. After cooling to about 40°, 160 parts water are added gradually, permitting the temperature to rise to about 80-85°. When the concentration of the sulfuric acid has been reduced to about 60%, a dark brown precipitate of the sulfate of the amino acridone has separated. It is stirred an hour longer at about 80°, then cooled to about 40°, filtered and washed with 60% sulfuric acid. The filter cake is slurried in 400 parts of water, at about 70°, filtered, washed free of mineral acid, and then dried. The amino dianthrimide acridone so obtained is a dark brown powder soluble in conc. sulfuric with an orange-brown color. It gives a blue vat from which cotton is dyed a strong red-brown shade. It may be purified by recrystallization from hot nitrobenzene.

Its benzoyl derivative is prepared as follows:

7.8 parts of the amino dianthrimide acridone so obtained are inroduced into 100 parts of nitrobenzene, then 0.8 part of pyridine and 3.0 parts of benzoyl chloride are added. While agitating the mass is heated to a temperature of about 180-190°, where it is maintained for 3 to 4 hours, when the benzoylation is substantially completed. After the reaction mass has been cooled to room temperature, it is filtered, washed with nitrobenzene and alcohol and dried. The yield of benzoylamino derivative is excellent. It is a brown crystalline body, dissolving in strong sulfuric acid with an orange-brown color and dyes cotton from a blue vat in strong yellow-brown shades.

By means of a treatment with an oxidizing agent, such as chromic acid or sodium hypochlorite considerably brighter and clearer shades are obtained on cotton.

*Example 11*

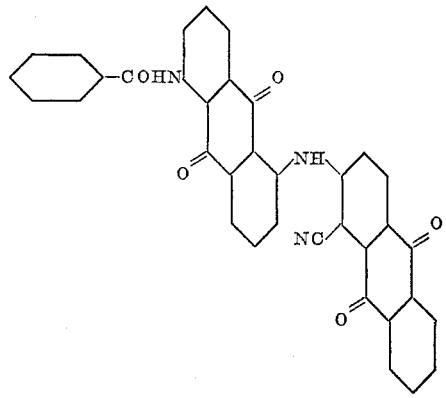

15.6 parts 2-bromo-1-cyano anthraquinone and 17.1 parts 1-amino-5-benzoylamino anthraquinone are introduced into 180 parts nitrobenzene. There is then added 8.5 parts anhydrous sodium acetate and 1.0 part cuprous chloride. This mass is now agitated and heated at 200-205° for about 7 to 8 hours. After cooling to about 90-100° the reaction mass is filtered, washed first with nitrobenzene and then with alcohol. It is then slurried in 200 parts water and 20 parts hydrochloric acid at about 50°, filtered, washed and dried. 5'- benzoylamino-1-cyano-2,1'-dianthrimide so obtained is a brick red body, dissolving in concentrated sulfuric acid with an olive-brown color which changes to blue on moderate heating.

*Example 12*

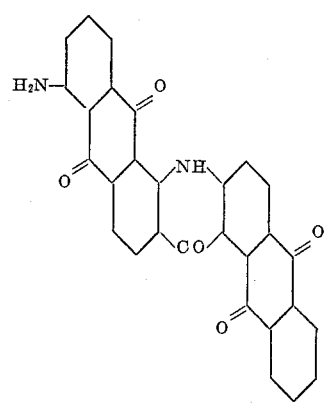

16.0 parts of 5'-benzoylamino-1-cyano-2,1'-dianthrimide, prepared as described in Example 11 are slowly added to 250 parts 98% sulfuric acid which is being agitated at room temperature. A brown colored solution is formed which is now heated up to about 120°, and maintained at this temperature for a few hours. The color of the sulfuric acid solution first changes to blue and finally to an orange-brown. After cooling to about 50° sufficient water is carefully added until the concentration of the acid has been reduced to about 60%. The dark colored substance which separates is then filtered off and washed with 60% sulfuric acid. The sulfate of the amino dianthrimide acridone so obtained is slurried in 150 parts water and sufficient caustic soda added to give an alkaline reaction. It is now filtered and washed with hot water until free of alkali and dried.

The amino dianthrimide acridone so obtained is a dark brown body, dissolving in concentrated sulfuric acid with an orange-brown color. It dyes cotton a violet-brown shade from a violet vat.

*Example 13*

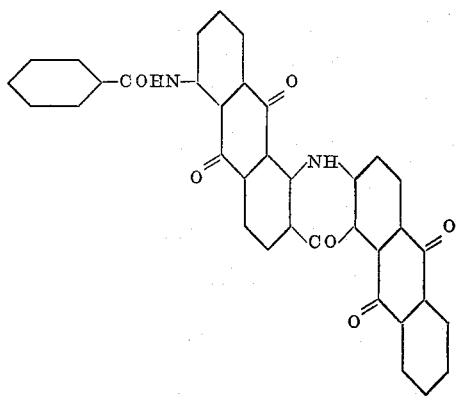

47 parts of the amino dianthrimide acridone prepared as described in Example 12 are introduced into a mixture of 42 parts benzoyl chloride, 8 parts pyridine and 900 parts nitrobenzene. This mass is then heated at about 200° for a few hours until the benzoylation is substantially completed. After cooling, the reaction mass is filtered, washed with alcohol and dried. The benzoylamino dianthrimide acridone so obtained is a dark red brown body, dissolving in concentrated sulfuric acid with an orange-brown color. It dyes cotton a strong red-brown shade from a blue-violet vat. The shade is considerably brightened if the crude dye is subjected to a treatment with sodium hypochlorite.

*Example 14*

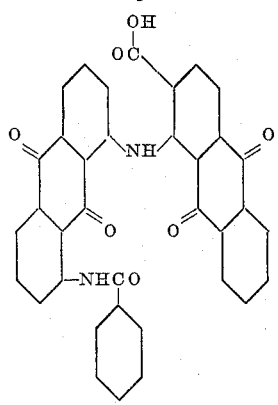

24.8 parts 1-benzoylamino-8-aminoanthraquinone are introduced into 180 parts nitrobenzene. Then there are added 27.1 parts 1-chloro anthraquinone-2-carboxy benzyl ester, 21.0 parts sodium carbonate, 8.5 parts sodium acetate (anhydrous) and 2.0 parts cuprous chloride. This mass is agitated at 190–195° for about ten hours, cooled to about 80°, diluted with an equal volume of alcohol and filtered. The 8-benzoylamino-1,1'-dianthrimide-2'-carboxy benzyl ester so obtained is isolated in the same manner as described in Example 1 for the 5-benzoylamino derivative.

Hydrolysis to the carboxylic acid is carried out in the same manner as described for the preparation of 5-benzamino-1,1'-dianthrimide-2'-carboxylic acid in Example 1. It is a brick-red body dissolving in concentrated sulfuric acid with a brown color.

*Example 15*

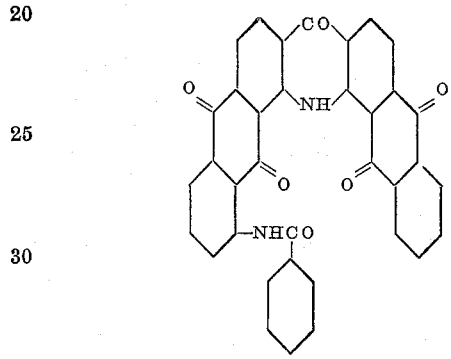

15.0 parts of 8-benzamino-1,1'-dianthrimide-2'-carboxylic acid, prepared as described in Example 14, are dissolved in 225.0 parts sulfuric acid monohydrate and agitated for about 3 hours at 75–80°. The original red-brown color of the sulfuric acid changes to an orange-brown color. After cooling to about 40°, water is cautiously added until the concentration of the acid has been reduced to about 75%. Sulfate of the amino acridone separates and is isolated by the same procedure as described for 5-amino-1,1'-dianthrimide-2,2'-acridone in Example 4.

Its benzoyl derivative is prepared in the same manner as described for 5-benzoylamino-1,1'-dianthrimide-2,2'-acridone in Example 4. It is a brick-red crystalline body, dissolving in strong sulfuric acid with an orange color. It dyes cotton a scarlet-red shade from a violet vat. Its shade is considerably brightened by subjecting it to an oxidation treatment as described in Example 5.

We claim:
1. A method of preparing a mono alpha acylamino dianthrimide acridone which comprises subjecting an ester of an orthocarboxy alpha monoacylamino dianthrimide to ring closure with a benzoyl chloride in an organic solvent in the presence of a minor amount of concentrated sulfuric acid with respect to the dianthrimide.

2. A method of preparing a mono alpha acylamino dianthrimide acridone which comprises subjecting an orthocarboxy alpha monoacylamino dianthrimide to ring closure in the presence of benzoyl chloride in an organic solvent and a minor amount of sulfuric acid with respect to the dianthrimide.

MARIO SCALERA.
ASA W. JOYCE.

(References on following page)

REFERENCES CITED

The following references are of record in the file of this patent:

UNITED STATES PATENTS

| Number | Name | Date |
|---|---|---|
| 1,696,499 | Mieg et al. | Dec. 25, 1928 |
| 1,706,933 | Mieg | Mar. 26, 1929 |
| 1,709,993 | Mieg et al. | Apr. 23, 1929 |
| 2,008,157 | Smith et al. | July 16, 1935 |
| 2,014,790 | Thomson et al. | Sept. 17, 1935 |

FOREIGN PATENTS

| Number | Country | Date |
|---|---|---|
| 894 | Great Britain | 1911 |
| 8,230 | Great Britain | 1912 |
| 268,219 | Germany | Dec. 10, 1913 |